April 15, 1969  H. E. McCABE  3,438,280
REMOTE CONTROL ASSEMBLY
Filed Oct. 21, 1966
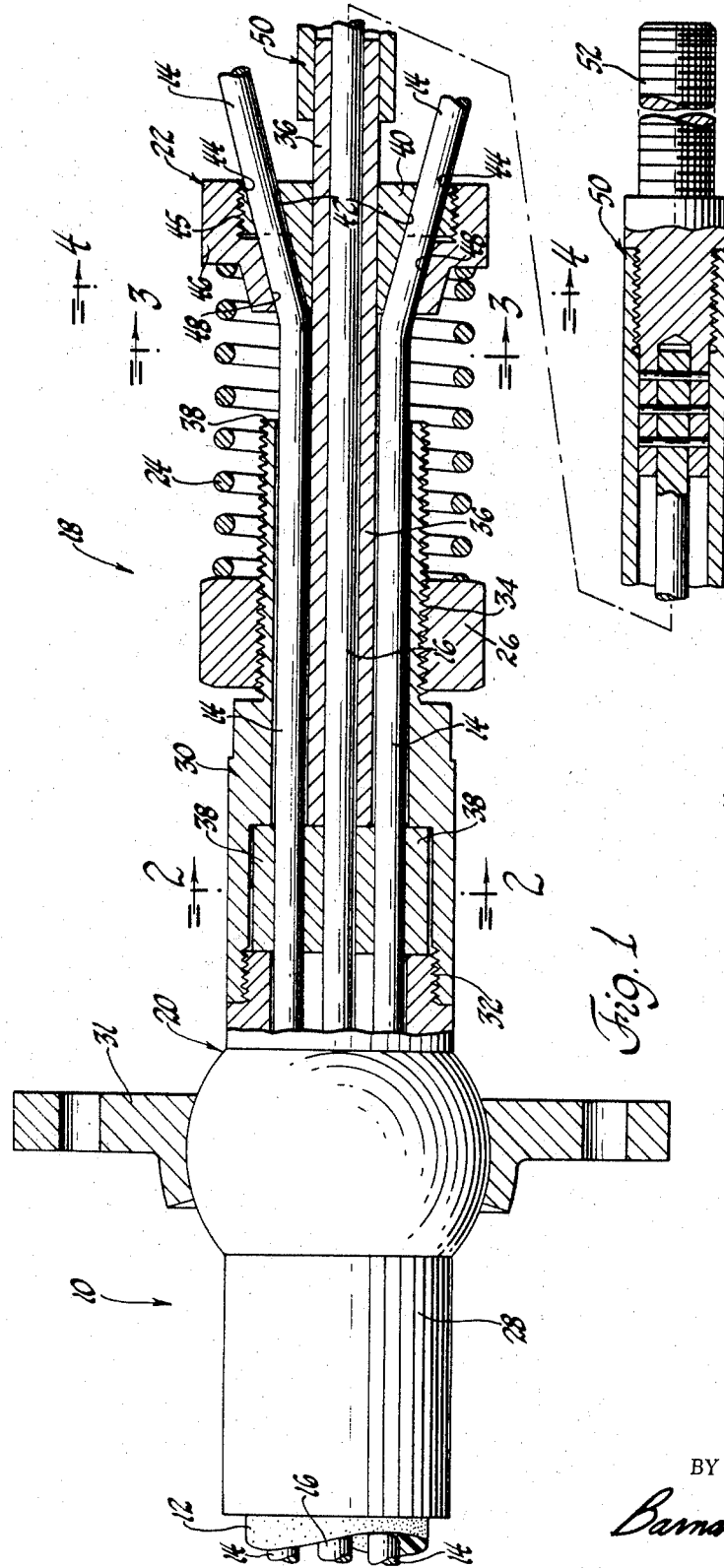
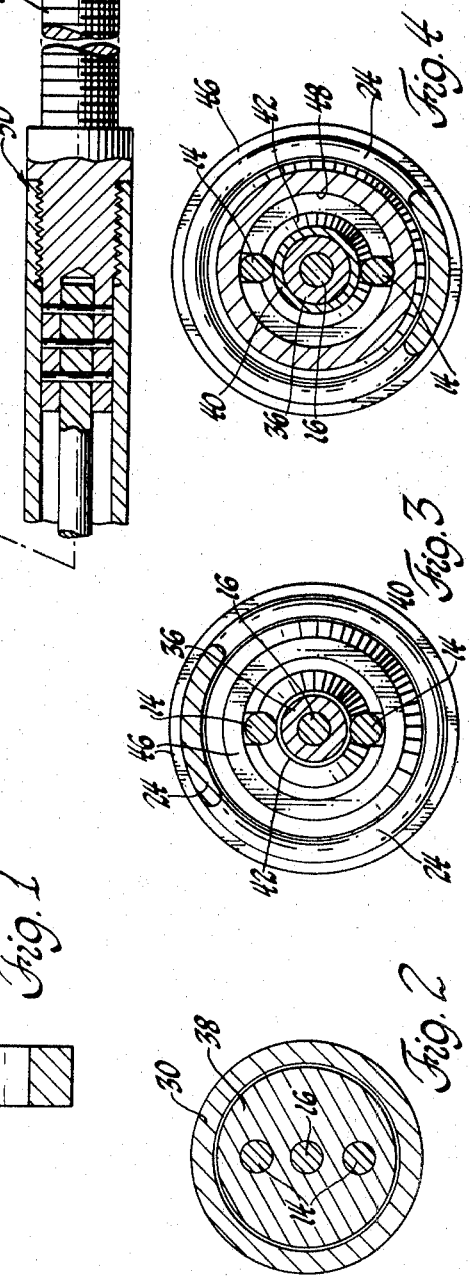
INVENTOR.
Harold E. McCabe
BY
Barnard, McGlynn Reising
ATTORNEYS

United States Patent Office 3,438,280
Patented Apr. 15, 1969

3,438,280
REMOTE CONTROL ASSEMBLY
Harold E. McCabe, Mahopac Falls, N.Y., assignor to Teleflex Incorporated, North Wales, Pa., a corporation of Delaware
Filed Oct. 21, 1966, Ser. No. 588,548
Int. Cl. F16c 1/10
U.S. Cl. 74—501                      15 Claims

ABSTRACT OF THE DISCLOSURE

A motion transmitting remote control assembly including a conduit for movably supporting a motion transmitting core element and tension bearing elements extending along the conduit with means attached to the conduit for allowing the tension bearing elements to move longitudinally relative to the conduit and relative to one another prior to and during the installation of the assembly so as to maintain the conduit readily flexible. Means are provided that are operable to prevent relative longitudinal movement of and between the tension bearing elements when the assembly is in an installed disposition.

---

This invention relates to a motion transmitting remote control assembly which is normally operated to control a device by transmitting tension or compression in a curved path by means of a flexible core element.

Remote control assemblies of the type to which the instant invention pertains include a conduit surrounding a motion transmitting core element which may be moved back and forth within the conduit to remotely control or position an element to which the core element is attached. In such assemblies, it is necessary that the conduit be able to withstand tension loads. That is to say, the conduit is normally disposed in a tortuous path and when the motion transmitting core element is moved longitudinally within the conduit, the conduit is urged by friction between the core element and conduit to move with the core element and is, therefore, placed in tension. The conduit, therefore, must be constructed to withstand reactive loads resulting from movement of the core element. In one type of prior art assembly long lay elements or filaments of wire are disposed helically on a long lead within the conduit and serve as tension-carrying members. One such conduit includes an inner tubular plastic member with a plurality of long lay wires wrapped helically on a long lead about the inner tubular member and a plastic casing surrounding the wires and the inner tubular member. The conduit must be able to transmit tension loads, yet remain flexible enough to be easily installed over a tortuous path. Thus, the conduits of the type utilizing a plurality of long lay wires or filaments are constructed so that the individual filaments may move longitudinally relative to one another to facilitate flexing of the conduit. If the adjacent filaments are not able to move relative to one another, the flexibility of the conduit is greatly reduced. Conduits of the above type which movably support the core element in the inner core thereof are very satisfactory for low load conditions, but when it is desirable to utilize a remote control assembly in heavy duty situations where high loads are transmitted over very long distances by a flexible core element which is movably supported within the conduit, roller elements are frequently utilized to facilitate the movement of the core element within the conduit. In many of the prior art assemblies which utilize roller elements for supporting the motion transmitting core element, spherical balls are disposed in rolling engagement with each side of the core element and a pair of races extend along the conduit and the spherical balls are in rolling engagement with the respective races. In assemblies utilizing roller elements, it is also necessary to provide tension bearing members for transmitting the reactive loads resulting from movement of the core element. In such assemblies, it has been the practice to secure at least one of the races in position so it cannot move longitudinally relative to the conduit, thus providing a tension bearing member. With the race thus fixed, however, the neutral bending axis of the conduit is the axis of the fixed race and the geometrical axis is the axis of the motion transmitting core element disposed within the conduit. When such an assembly is installed in a tortuous path, it naturally tends to bend about the geometrical axis but such bending is prohibited because of the fixed race. Hence, the bending axis turns out to be the axis of the race, and due to this, the flexibility of the conduit is significantly reduced. And more specifically, the installation of such assemblies is limited to a situation wherein the fixed race is disposed on the outside of the bend or curve in the conduit. In addition, the non-fixed race or float race, when the assembly is in an installed position, tends to bulge on the outside of the curves upon movement of the core element so that when the core element is moved in the opposite direction, there is provided sufficient slack in the core element to allow the core element to move a given distance at the actuated end without moving at the other end.

Thus, a problem associated with prior art remote control assemblies, whether they are the low load type or the high load type utilizing roller elements, is that a tension bearing element must be provided to transmit reactive loads caused by movement of the core element and to accomplish this the tension bearing element must be attached to the support structure at the opposite ends of the assembly, as, for example, by being secured to fittings which in turn are disposed at the ends of the conduit and are adapted to be attached to a support structure; however, such rigid securement of the tension bearing element at the ends of the conduit greatly reduces the flexibility of the conduit and thereby causes installation problems. Yet once the assembly is installed, there is no need for flexibility since the conduit remains in a given path.

Accordingly, it is an object and feature of this invention to provide a motion transmitting remote control assembly including a conduit for movably supporting a motion transmitting core element and tension bearing elements extending along the conduit with means attached to the conduit for allowing the elements to move longitudinally relative to the conduit and relative to one another prior to and during installation of the assembly so as to maintain the conduit readily flexible but which is operable to prevent relative longitudinal movement of and between the tension bearing elements when the assembly is in the installed position, thereby overcoming the foregoing disadvantages of the prior art assemblies.

In general, these and other objects and features of this invention may be attained in a motion transmitting remote control assembly including a conduit with a pair of tension bearing elements extending along the conduit. A fitting, which is adapted to be connected to a support structure, is secured to the end of the conduit and the tension bearing elements extend through the fitting and out the opposite end thereof. A motion transmitting core element is disposed between the tension bearing elements and also extends through the fitting. The fitting includes a main body portion and a guide support extending axially from the end of the body portion. A clamping means is slidably disposed on the guide support and in spaced relation to the main body portion. The tension bearing elements extend through the main body portion and then through the clamping means. The clamping means is operable to selectively grip or clamp the tension bearing elements, thus preventing relative longitudinal movement of and between the tension bearing elements. A biasing means comprising a spring is disposed between the clamping means and the main body portion of the fitting so that when the clamping means clampingly engages or grips the tension bearing elements, the spring urges the clamping means away from the main body portion of the fitting and places the tension bearing elements under tension. Therefore, the clamping means allows the tension bearing elements to move longitudinally relative to one another during the installation of the assembly and is operable to clamp the tension bearing elements once the assembly is in the installed position to prevent relative movement between the tension bearing elements, thereby increasing the rigidity of the assembly and substantially reducing, if not eliminating, backlash, i.e., slack which may occur during movement of the core element.

Other objects and attendant advantages of this invention will be readily appreciated as the same becomes better understood by reference to the following detailed description when considered in connection with the accompanying drawings wherein:

FIGURE 1 is a fragmentary cross-sectional view of a preferred embodiment of the instant invention;

FIGURE 2 is a cross-sectional view taken substantially along line 2—2 of FIGURE 1;

FIGURE 3 is a cross-sectional view taken substantially along line 3—3 of FIGURE 1; and FIGURE 4 is a cross-sectional view taken substantially along line 4—4 of FIGURE 1.

Referring now to the drawings, wherein like numerals indicate like or corresponding parts throughout the several views, a motion transmitting remote control assembly constructed in accordance with the instant invention is generally shown at 10. The remote control assembly 10 comprises a conduit 12 and at least two tension bearing elements 14 extending along the conduit 12. The tension bearing elements 14 are disposed in opposite diametrical halves of the conduit at least at the ends of the conduit. There is also included a motion transmitting core element 16 which is movably disposed between the tension bearing elements 14.

The remote control assembly 10 also includes means, generally indicated at 18, attached to the conduit 12 for allowing the tension bearing elements 14 to move longitudinally relative to the conduit 12 and relative to one another prior to and during installation of the assembly 10 and operable to prevent relative longitudinal movement of and between the tension bearing elements 14 when the assembly 10 is installed. The means 18 includes a fitting attached to the conduit 12 and generally indicated at 20, and a clamping means generally indicated at 22 and selectively operable to allow or prevent relative longitudinal movement between the tension bearing elements 14. As will be more fully hereinafter described, the clamping means 22 is movable relative to the fitting 20 and there is included biasing means comprising the spring 24 for urging the clamping means 22 away from the fitting 20 for applying tension to the tension bearing elements 14 as the clamping means 22 prevents relative longitudinal movement between the tension bearing elements 14. In addition, the adjustment nut 26 comprises an adjustment means for varying the tension applied by the spring 24 to the tension bearing elements 14.

The fitting 20 includes a main body portion which is attached to the conduit 12 by adhesive, crimping, or the like. More specifically, the main body portion includes a first section 28 which is attached to the conduit and a second section 30, which is threadedly connected at 32 to the first section 28. There is included a plate 31 which may be secured to a bulkhead, bracket, or the like, and the first section 28 of the fitting 20 is articulately mounted in the plate 31; thus, the fitting 20 is adapted to be attached to a support structure. The second section 30 threadedly supports the adjustment nut 26 by the threads 34. The fitting 20 also includes a guide support portion 36 which extends axially with respect to an end of the main body portion of the fitting 20. As will be more clear hereinafter, the clamping means 22 is slidably supported on the guide support 36. The guide support 36 has an enlarged portion 38 which is rotatably disposed between the first and second sections 28 and 30 of the fitting 20. Thus, the entire guide support 36 is rotatable about the longitudinal axis of the assembly.

The clamping means 22 includes a male first member 40 which is slidably disposed on the guide support 36. The male first member 40 has a conically tapered outer surface 42 and the tension bearing elements 14 extend over the surface 42 and through the holes 44. Thus, the tension bearing elements 14 extend through the fitting 20, along the support guide 36, over the conical surface 42, and through the first member 40. The clamping means 22 also includes a female second member 46 which has a conically tapered inner surface 48. The second member 46 is operatively connected and movable relative to the first member 40 for clamping the tension bearing elements 14 between the conically tapered surfaces 42 and 48. That is to say, the second member 46 threadedly engages the first member 40 as indicated at 45 and upon rotation of the second member 46, relative movement occurs between the members 40 and 46.

A slider member 50 is slidably disposed on the guide support 36 at a position outwardly of the clamping means 22. The slider member 50 is secured to the core element 16 and is threaded at 52 or otherwise adapted for attachment to a control element so that upon movement of the slider member 50, the core element 16 moves longitudinally within the conduit, or vice versa.

Before the assembly is installed, the female second member 46 is rotated relative to the first member 40 to move the inner conical surface 48 away from the tension bearing elements 14 so that the tension bearing elements 14 are free to move relative to one another, relative to the fitting 20, and relative to the conduit 12. With the tension bearing elements 14 being thus readily movable, the conduit is very flexible and may be installed in any one of various tortuous paths. Once the assembly is installed, the female second member 46 is rotated to clamp the tension bearing elements 14 between the conically tapered surfaces 42 and 48 to prevent relative longitudinal movement of and between the tension bearing elements 14. The spring 24 urges the clamping means 22 to slide along the guide support 36 to place a tension load on the tension bearing elements 14 thereby to prevent backlash or slack in movement of the core element 16. With the tension bearing elements 14 thus clamped or gripped, the flexibility of the assembly is greatly reduced thereby to substantially reduce or eliminate backlash. The tension or the force applied by the spring 24 to the tension bearing elements 14 may be adjusted by rotating the nut 26 which in turn compresses or expands the spring 24.

It will be understood that the instant invention may be utilized with various remote control assemblies having tension bearing elements; however, the instant invention is particularly adaptable for use with remote control assemblies of the type utilizing roller elements for supporting the motion transmitting core element to reduce friction or drag in moving the core element. In the invention shown, such roller elements are preferably utilized to support the core element although they have not been specifically disclosed. A more complete disclosure of such an assembly is set forth in applicant's copending application Ser. No. 588,597 filed Oct. 21, 1966, and assigned to the assignee of the instant invention. In addition, the instant invention is particularly well suited for use with the remote control assemblies set forth in applicant's copending applications Ser. No. 585,637 filed Oct. 10, 1966, and Ser. No. 585,634 filed Oct. 10, 1966, and assigned to the assignee of the instant invention.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A motion transmitting remote control assembly comprising; a conduit, at least two tension bearing elements extending along said conduit, and means attached to said conduit for allowing said elements to move longitudinally relative to said conduit and relative to one another and selectively operable to prevent relative longitudinal movement between said elements.

2. A motion transmitting remote control assembly as set forth in claim 1 wherein said tension bearing elements are disposed in opposite diametrical halves of said conduit at least at the ends thereof.

3. A motion transmitting remote control assembly as set forth in claim 1 wherein said means includes biasing means for applying tension to said elements.

4. A motion transmitting remote control assembly as set forth in claim 3 including adjustment means for varying the tension applied by said biasing means to said elements.

5. A motion transmitting remote control assembly as set forth in claim 1 wherein said means includes a fitting attached to said conduit and clamping means selectively operable to allow and prevent relative longitudinal movement between said elements.

6. A motion transmitting remote control assembly as set forth in claim 5 wherein said clamping means is movable relative to said fitting and including biasing means urging said clamping means away from said fitting for applying tension to said elements as said clamping means prevents relative longitudinal movement therebetween.

7. A motion transmitting remote control assembly as set forth in claim 6 including adjustment means for varying the tension applied by said biasing means to said elements.

8. A motion transmitting remote control assembly as set forth in claim 5 wherein said fitting includes a main body portion attached adjacent a first end to said conduit, and a guide support portion extending axially from the second end of said main body portion, said clamping means being slidably supported on said guide support.

9. A motion transmitting remote control assembly as set forth in claim 8 including biasing means disposed between said main body portion and said clamping means for urging said clamping means to slide along said guide support and away from said main body portion.

10. A motion transmitting remote control assembly as set forth in claim 9 including adjustment means for varying the force applied to said clamping means by said biasing means.

11. A motion transmitting remote control assembly as set forth in claim 9 wherein said clamping means comprises a first member slidably disposed on said guide support and having a conically tapered outer surface, said tension bearing elements being disposed to extend through said fitting along said support guide and over said conical surface and through said first member, and a second member having a conically tapered inner surface and operatively connected and movable relative to said first member for clamping said tension bearing elements between said conically tapered surfaces.

12. A motion transmitting remote control assembly as set forth in claim 11 including a motion transmitting core element movably supported in said conduit and extending through said guide support of said fitting, and a slider member slidably disposed on said guide support outwardly of said clamping means and secured to said core element.

13. A motion transmitting remote control assembly as set forth in claim 12 wherein said biasing means comprises at least one spring engaging said second member at one end thereof and engaging said adjustment means comprising an adjustment nut at the other end thereof, said adjustment nut threadedly engaging said main body portion for varying the force applied by said spring to said second member.

14. A motion transmitting remote control assembly as set forth in claim 13 wherein said main body portion of said fitting includes a first section attached to said conduit, and a second section threadedly connected to said first section and threadedly supporting said adjustment nut, said guide support having an enlarged section rotatably disposed between said first and second sections.

15. A motion transmitting remote control assembly as set forth in claim 14 including a plate, said first section being articulatively mounted in said plate.

References Cited
UNITED STATES PATENTS

| | | | |
|---|---|---|---|
| 1,279,208 | 3/1918 | Wright et al. | 74—501 |
| 1,427,829 | 9/1922 | Luckey | 74—501 |
| 2,048,398 | 7/1936 | Lasker | 74—501 |
| 2,380,015 | 7/1945 | Batterson et al. | 74—501 |
| 2,595,134 | 4/1952 | Gordon. | |
| 2,787,917 | 4/1957 | Schroeder | 74—502 |
| 3,039,420 | 6/1962 | Bevis et al. | |
| 3,123,879 | 3/1964 | Boduroff et al. | 287—114 X |
| 2,845,813 | 8/1958 | Richoux | 74—501.5 |
| 3,309,744 | 3/1967 | Sironi et al. | 287—114 X |

FRED C. MATTERN, Jr., *Primary Examiner.*

CAROLYN F. GREEN, *Assistant Examiner.*

U.S. Cl. X.R.
287—114; 74—502